Sept. 25, 1951     R. E. PERVIS     2,568,822
DISK TYPE LAWN MOWER
Filed Dec. 8, 1949     2 Sheets-Sheet 1
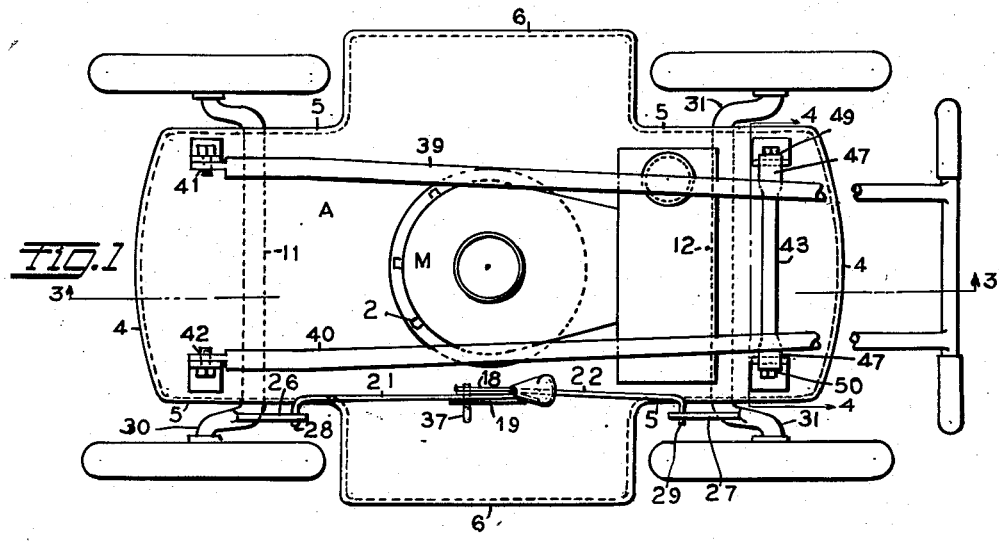
INVENTOR
RALPH EMORY PERVIS
BY *Edward H. Fisher* ATTY.

Sept. 25, 1951 R. E. PERVIS 2,568,822
DISK TYPE LAWN MOWER
Filed Dec. 8, 1949 2 Sheets-Sheet 2
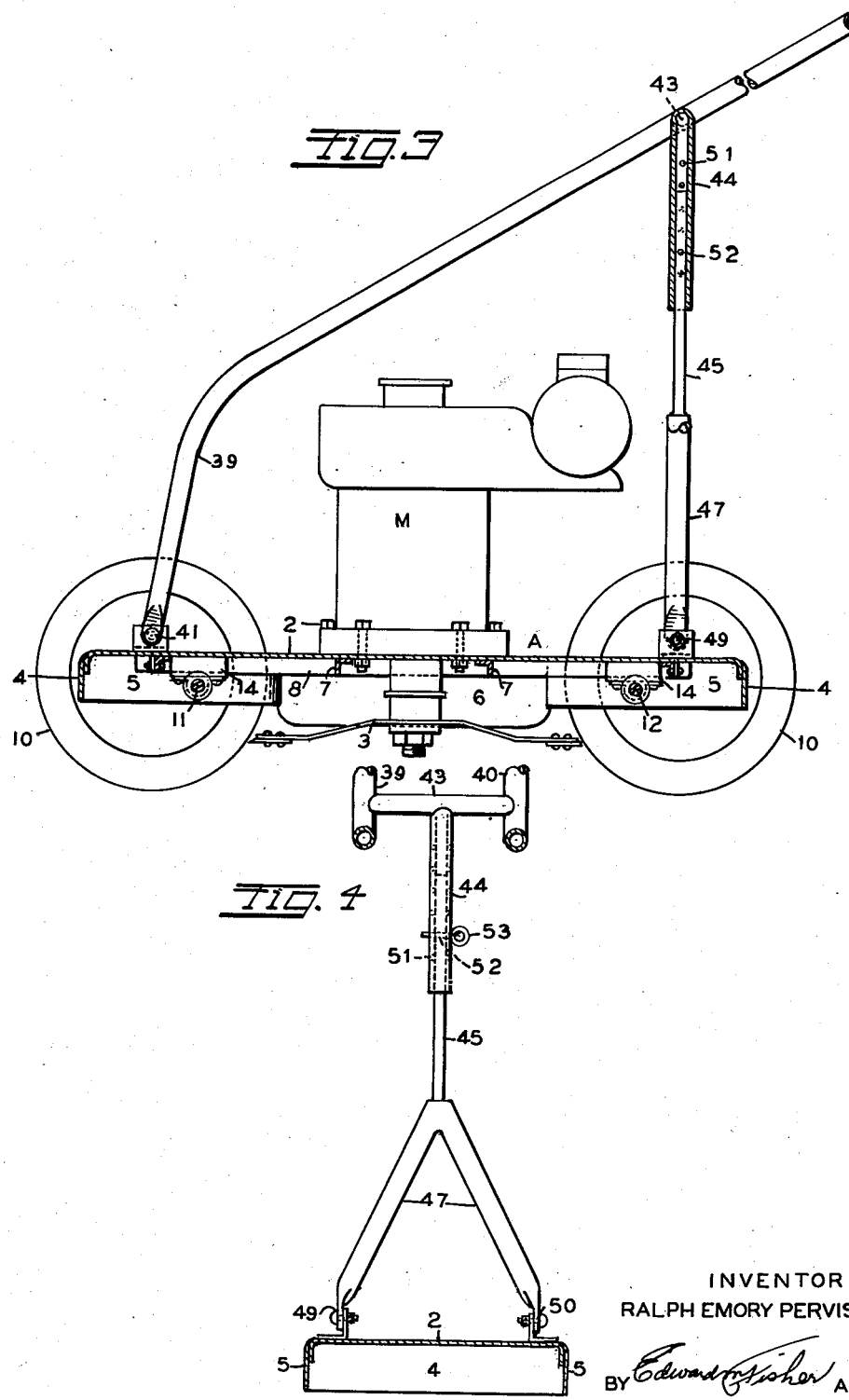
INVENTOR
RALPH EMORY PERVIS
BY Edward Fisher ATTY.

Patented Sept. 25, 1951

2,568,822

UNITED STATES PATENT OFFICE 2,568,822

DISK TYPE LAWN MOWER

Ralph Emory Pervis, Maitland, Fla.

Application December 8, 1949, Serial No. 131,890

4 Claims. (Cl. 56—25.4)

1

This invention relates to improvement in mowers.

An object of this invention is to provide a machine which is structurally inexpensive and which is especially adapted to lawn mowing wherein numerous adjustments of a blade, which is rotated horizontally, are often required.

A further object of this invention is to provide a mower whereby the operator can cut close to buildings, shrubbery, trees and sundry items, without damage to same, a guard in the form of a spacer as between the item and mower blade being a part of the mower structure.

Other and further objects will appear as the description proceeds.

This invention resides substantially in the combination, construction, arrangement and relative location of parts, all in accordance with the disclosure herein.

In the acompanying drawings:

Figure 1 is a plan view of this invention.

Figure 2 a side elevation thereof, immediate wheels removed.

Figure 3 a section on line 3—3, Figure 1.

Figure 4 a section on line 4—4, Figure 1, to illustrate adjusting means for raising or lowering the gripping end of the handle member.

The true nature and manner of use of a mower in accordance with this invention will be best understood by a detailed description of the form thereof shown in the drawings in an illustrative sense.

Now referring more particularly to the drawings A designates a mower bed of cross-like shape and having centrally thereon a prime-mover M fixed to the bed by bolts 2 or similar means, the drive shaft of the prime mover being extended downward thru said bed and having removably engaged on the lower end thereof a mowing blade 3 for rotation with said shaft.

Bed A is formed with under transverse and longitudinal supports 7 and 8, respectively, and edge aprons designated as end, side and extended side aprons 4, 5, and 6, respectively, purpose of the extended side aprons 6 being not only the forming of a blade guard but to also form a spacer as between buildings, trees, shrubbery, and sundry items, thus preventing blade damage thereto, and permit close cutting from the side of the mower to said items.

Body A is supported by wheels 10, which occupy space provided by recessed side portions of the body, thru means of front and rear crank shafts 11 and 12 respectively, horizontal portions thereof being in engagement with the underside of the

2 bed by means of bearing brackets 14, said wheels 10 being rotatably carried on offset ends 15 of said shafts.

For vertical adjustment of blades 3 there is a lever 18 in central pivotal engagement, as at 20, with a bracket member 19 fixed to the mower bed A, said lever having at its opposite ends pivot engagement with one end of rod members 21 and 22, as at 24 and 25, respectively, opposite ends of the rod members having pivot connection with outer ends of arms 26 and 27 as at 28 and 29, respectively, opposite ends of said arms being welded or having other fixed engagement with front and rear shaft offsetting portions 30 and 31, respectively, inward from the horizontal center of said shafts for leverage rotation of the shafts in their bearing brackets 14 and thus easily raise or lower the mower bed and blade, same being raised as lever 18 is moved clockwise and lowered on reverse movement.

It will be observed that the bracket 19 has a series of apertures 35 in equal radius to pivot 20 and in the lever is an aperture adapted for axial alignment with a selected aperture 35, thus forming means for locking said lever when the lever aperture is set to one of the apertures 35, by inserting a pin 37 or other means.

For handle adjustment, to raised or lowered position of the mower body, I prefer a handle composed of parallel tubular members 39 and 40 each having forward pivotal engagement with the mower bed as at 41 and 42, respectively, and a rear connecting member 43 thru which said handle is supported by a central tubular post 44 having telescopic jointure with member 45 forming upper portion of bifurcated handle support, lower branches 47 of same being pivotally engaged with mower bed A as at 49 and 50, respectively.

Adjusting means as between the telescoped portions includes a series of oppositely disposed apertures 51 in tubular post 44 and an aperture 52 in member 45 whereby when adjustment is made as between said apertures a pin 53 is inserted, Figure 4.

While preferred specific embodiments of the invention are hereinbefore set forth, it is to be understood that I am not to be limited to the exact structure illustrated and described, as various modifications of these details may be provided in putting the invention into practice, within the purview of the appended claims.

What is claimed:

1. A mowing machine, comprising: an elongated body chassis disposed in a horizontal plane having corner recesses providing fore and aft end extensions, axles operatively connected to said extensions, said axles being provided with wheel bearing crank terminals confronting the fore and aft recesses, means operatively connecting said axles for adjustment of the same, whereby the chassis may be vertically adjusted, said body chassis being provided with laterally extended portions intermediate the corner recesses, a shaft extending vertically through the mid-portion of the body chassis and having a cutter on its lower end beneath the said body chassis, and means on the chassis operatively connected to the shaft for rotation thereof.

2. A mowing machine, comprising: an elongated body chassis disposed in a horizontal plane having corner recesses providing fore and aft end extensions, axles operatively connected to said extensions, said axles being provided with wheel bearing crank terminals confronting the fore and aft recesses, means operatively connecting said axles for adjustment of the same, whereby the chassis may be vertically adjusted, said body chassis being provided with laterally extended portions intermediate the corner recesses, a shaft extending vertically through the mid-portion of the body chassis and having a cutter on its lower end beneath the said chassis, means on the chassis operatively connected to the shaft for rotation thereof, and aprons depending from the outer edge of each extension.

3. A mowing machine, comprising a substantially horizontally disposed body chassis having fore and aft extensions, wheel supporting axles operatively connected to said extensions, said axles being provided with wheel-bearing crank terminals, means operatively connecting said axles for rotatable adjustment of the same, including a handle member and links extending in opposite directions from said handle member and connected to a crank terminal on each of said axles, whereby the chassis may be vertically adjusted, a shaft extending vertically through the mid portion of the body chassis and having a cutter on its lower end beneath the said body chassis, and means on the chassis operatively connected to the shaft for rotation thereof.

4. A mowing machine, comprising a substantially horizontally disposed body chassis having fore and aft extensions, wheel supporting axles operatively connected to said extensions, said axles being provided with wheel-bearing crank terminals, means operatively connecting said axles for rotatable adjustment of the same, including a handle member and links extending in opposite directions from said handle member and connected to a crank terminal on each of said axles, whereby the chassis may be vertically adjusted, a shaft extending vertically through the mid portion of the body chassis and having a cutter on its lower end beneath the said body chassis, means on the chassis operatively connected to the shaft for rotation thereof, and aprons depending from the outer edge of each extension.

RALPH EMORY PERVIS.

REFERENCES CITED

The following references are of record in the file of this patent:

UNITED STATES PATENTS

| Number | Name | Date |
|---|---|---|
| 2,143,057 | Danielson | Jan. 10, 1939 |
| 2,188,110 | Fahnestock | Jan. 23, 1940 |
| 2,198,526 | Cockburn | Apr. 23, 1940 |
| 2,208,972 | Goodall | July 23, 1940 |
| 2,259,676 | Winchell | Oct. 21, 1941 |
| 2,263,368 | Sejkora | Nov. 18, 1941 |
| 2,403,236 | Phelps | July 2, 1946 |
| 2,485,984 | Newman | Oct. 25, 1949 |
| 2,489,730 | Soenkensen | Nov. 29, 1949 |
| 2,491,544 | Arkenberg | Dec. 20, 1949 |
| 2,505,377 | Barker et al. | Apr. 25, 1950 |